US005089666A

United States Patent [19]

DiVila

[11] Patent Number: 5,089,666

[45] Date of Patent: Feb. 18, 1992

[54] CABLE AND METHOD OF MANUFACTURING THEREOF

[75] Inventor: Edward C. DiVila, Rahway, N.J.

[73] Assignee: Ace Electronics Inc., Carteret, N.J.

[21] Appl. No.: 518,137

[22] Filed: May 3, 1990

[51] Int. Cl.$^5$ ........................ H01B 7/00; H01B 13/00; H02G 15/02; H01R 43/00

[52] U.S. Cl. ........................ 174/74 R; 156/47; 174/84 C; 174/89; 174/113 C; 174/131 A; 439/389; 439/433; 439/434; 439/452

[58] Field of Search ..................... 174/74 R, 84 C, 89, 174/131 R, 131 A, 113 C; 156/47; 439/387, 389, 433, 434, 452, 583

[56] References Cited

U.S. PATENT DOCUMENTS

| | | | |
|---|---|---|---|
| 1,748,765 | 2/1930 | Hellermann . | |
| 2,189,987 | 2/1940 | Kellems | 439/447 |
| 2,696,518 | 12/1954 | Roehmann et al. . | |
| 3,264,602 | 8/1966 | Schwartz . | |
| 3,622,685 | 11/1971 | Crowl | 174/84 C |
| 4,116,153 | 9/1978 | Fisher et al. | 174/9 F |
| 4,135,056 | 1/1979 | Sequin | 174/113 C |
| 4,313,027 | 1/1982 | Vives | 174/70 S |
| 4,399,322 | 8/1983 | Hafner, Jr. | 174/131 A X |
| 4,408,822 | 10/1983 | Nikitas | 439/583 |
| 4,443,658 | 4/1984 | Sequin | 174/113 C |
| 4,447,100 | 5/1984 | Dyce et al. | 174/75 C X |
| 4,487,995 | 12/1984 | Hurwitz | 174/74 R |
| 4,509,877 | 4/1985 | Sobin et al. | 24/115 N |
| 4,766,553 | 8/1988 | Kaya et al. | 364/506 |
| 4,896,000 | 1/1990 | Procter et al. | 174/74 R |
| 4,941,113 | 7/1990 | Dundics et al. | 364/551.01 |
| 4,979,911 | 12/1990 | Spencer | 439/583 |

FOREIGN PATENT DOCUMENTS

| | | | |
|---|---|---|---|
| 1540027 | 1/1970 | Fed. Rep. of Germany | 439/583 |
| 1084946 | 1/1955 | France | 174/74 R |

*Primary Examiner*—Morris H. Nimmo

*Attorney, Agent, or Firm*—Bucknam and Archer

[57] ABSTRACT

A novel cable for computerized monitoring system comprises at least one outer jacket of plastic abrasion resistant material, one inner layer of fiber reinforcing material and another jacket of plastic abrasion resistant material. The end which is intended to be connected to the tool has a clamp to hold the fiber reinforcing material in place and prevent the fiber reinforcing material from being damaged. The clamp is a hollow cylinder about 1 inch in length with a flange, is internally threaded and is provided with at least one, preferably four grooves. When the clamp is snapped over the end of the cable, the threads engage the plastic material of the outer jacket and the reinforcing material is held in the grooves.

7 Claims, 3 Drawing Sheets

CABLE AND METHOD OF MANUFACTURING THEREOF

The present invention relates to computerized monitoring systems and more specifically to cables for use in computerized monitoring systems.

BACKGROUND OF THE INVENTION

In many industries, computerized monitoring systems are used for a variety of operations. In the automobile industry, in particular, computerized monitoring systems are used for many operations, such as checking whether bolts are sufficiently tight, whether wheels and doors are properly aligned, whether the engines function properly, for detecting faulty electrical and electronic components, and others. Computerized monitoring systems have been extensively used in the last twenty years and their use is increasing. A variety of tools are used for these purposes, and the tools must be connected with the computer terminals. Cables are needed to connect the tools with the computer terminals and a variety of cables have been used for these purposes. However, in spite of the increase in the number of computerized systems, little or no research appears to have been carried out with respect to the cables required for these operations. Indeed to the best of our knowledge, known cables have presented many drawbacks, namely breakage, stiffness, too great weight and too great length. Further during operation the wires used as conductors and located in the interior of the cables are likely to break after a short use. Clearly this is a serious drawback because of the expense involved in replacing the material and time required in replacing the cables. There has also been the erroneous belief that the cables had to be thick, stiff, long but the drawbacks, time and money losses have turned out to be more and more serious.

SUMMARY OF THE INVENTION

The object of the invention is to provide a novel cable for use in computerized monitoring systems, which is more durable, more flexible, lighter in weight and which permits to achieve substantial saving in time and materials.

Another object is to provide a novel cable for use particularly in the automobile industry but with possible applications in other fields.

Still another object is to provide a method for the production of the novel cable according to the invention.

DESCRIPTION OF THE PREFERRED EMBODIMENT

The invention will now be described in detail by reference to the accompanying drawings of which:

Figure 1:
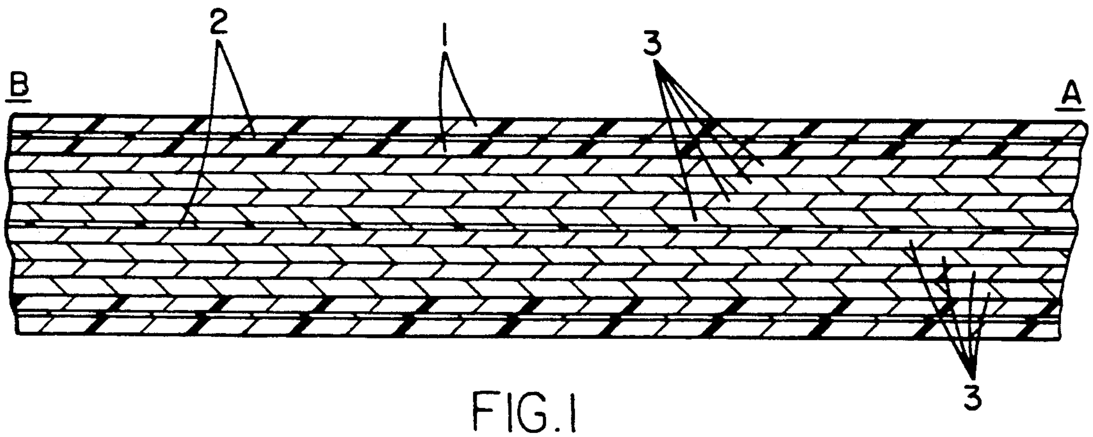
FIG. 1 is an overall side view of the cable of the present invention.

By reference to FIG. 1, the symbol A designates the end of the cable to be connected to the tool and the symbol B indicates the end which is intended to be connected with the computer terminals. The novel cable has a diameter about $\frac{1}{4}$-$\frac{3}{8}$ inch and provides for the conductor wires to go through. The cable could be as short as one foot and as long as 100 feet or even more. It comprises at least one outer jacket 1 of plastic abrasion resistant material such as polyurethane, polyvinyl chloride, natural or synthetic rubber, neoprene, chloroprene. Within the interior of the first and second jacket, if two jackets are used, the cable comprises at least one and preferable two layers of reinforcing fibers 2 of a material which is flexible and of high tensile strength. FIG. 1 shows two layers of fibers. The flexibility measured in terms of modulus should be 18 million lb/in$^2$. The tensile strength measured in lb/in$^2$ should be at least 400,000 lb/in$^2$. Kevlar is an aramid fiber. This fiber is made up essentially of a material which is polyterephthaloylchloride-p-(phenylenediamine). This material has high flexibility and high tensile strength and is referred to hereinbelow as the reinforcing material.

Figure 2:
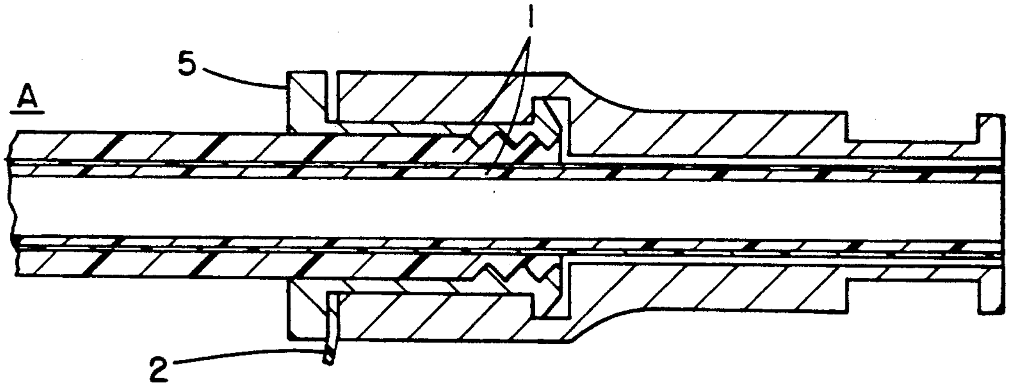
FIG. 2 is a longitudinal cross section of the cable in FIG. 1 at the end which is intended to be connected with the tool.

The wire conductors 3 (not shown in FIG. 2) are placed in the cable adjacent to the one or two layers of the outer jacket or jackets 1 and the reinforcing material 2, that is preferably the cable comprises an outer jacket of plastic abrasion resistant material, for instance polyurethane, a layer of reinforcing material, another jacket of plastic abrasion resistant material, the conductors and another layer of reinforcing material. The conductors are very high stranded materials commercially available, for instance 24 gage 41/40 strands of tin-copper.

An optional feature according to the invention is the provision of a net of steel 9 placed at the end of the cable which is to be connected to the computer, for a length of about five inches. This net provides additional strength while not interfering with the flexibility of the cable.

Figure 6:
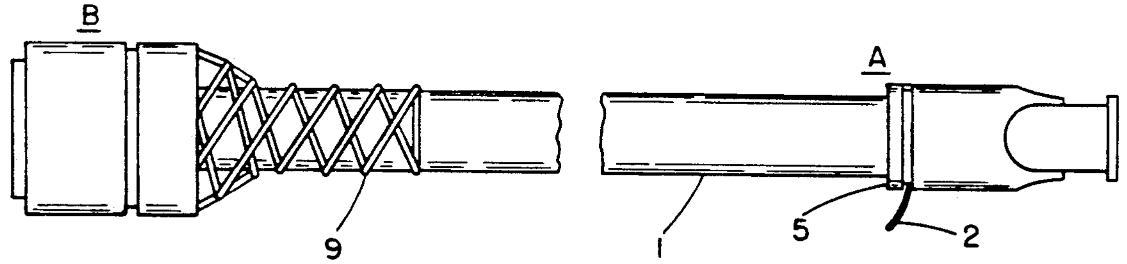
FIG. 6 illustrates the assembled completed cable.

The end of the cable B which is intended to be connected to the computer, during operation has a connector which is conventional, plus the steel net (trade name Kellems) as shown in FIG. 6.

An essential feature of the invention is the method of holding the conductors to the end A of the cable. Several methods have been tried with results not totally satisfactory. According to an earlier method, a small portion of the reinforcing material was allowed to protrude from the cable and an adapter was placed over the cable while the outer layer or layers of the reinforcing material were not allowed to extend up to the end of the cable but they extended only to cover partially the adapter. A ferrule of the crimp type was placed over the outer jacket. This method was not too satisfactory because, under tension and extreme flexing, the ferrule pulled off of the adapter and the Kevlar offered no tensile strength to the cable.

Another method consisted of making two orifices in the front end of the adapter to tie the reinforcing material to the end of the cable. A second ferrule of the crimp type was placed over the adapter. Also this method was not too satisfactory because although better than with one ferrule, the second ferrule had a tendency to detach from the adapter.

Figure 3:
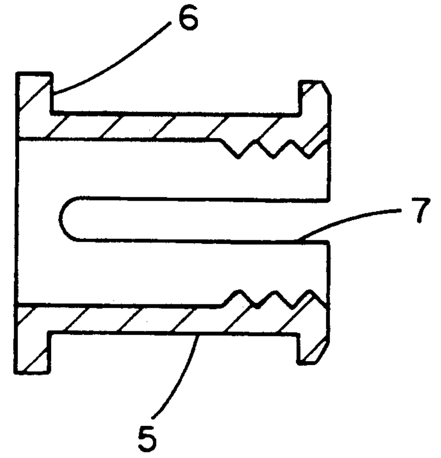
FIG. 3 is a longitudinal view in cross section of the clamp used at the end intended to connect with the tool.
Figure 5:
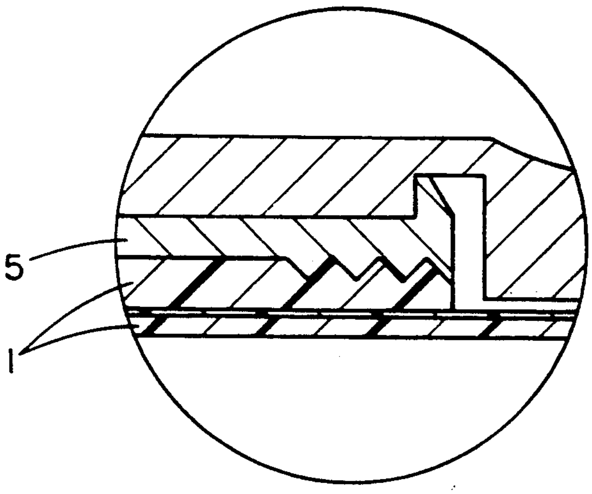
FIG. 5 is a partial side view in cross section of the clamp when installed.
Figure 4:
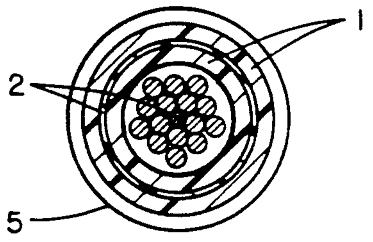
FIG. 4 is a cross section of the cable with clamp installed.

The method used which has proved to be very satisfactory consists of using a clamp 5 placed over the outer jacket. The clamp is about one inch in length and of diameter essentially the same as the overall diameter of the cable. The clamp is internally threaded and when it is snapped over the end of the cable, the material of the outer jacket engages with the inner threads of the clamp. The clamp has a flange 6 at the bottom which is placed towards the center of the cable. At the opposite end the clamp has at least one, preferably four (only one is shown in FIG. 3) longitudinal grooves 7 which extend almost to the flange. When the clamp is snapped over the cable, the reinforcing material is held in the grooves and cannot slip out.

The method of preparation of the cable is simple. After the cable is assembled with the conductors located between the jacket 1 and the reinforcing material 2, the clamp 5 is snapped over the end of the cable with the flange 6 away from the end. The threads of the clamp become engaged with the jacket 1 and the end of the reinforcing material 2 enters into the grooves 7 of the clamp.

The cable according to the present invention has been found to be very satisfactory because of its high flexibility and high tensile strength and low weight. It has been found that, while conventional cables frequently break even after ½ hour use, the cable according to this invention may be satisfactory used 8–10 hours a day and after four months of continuous use it is still in good working condition.

What is claimed is:

1. In a cable for a computerized monitoring system wherein a cable during operation connects a tool to a computer terminal said cable having a first end to be connected to said tool and a second end to be connected to said computer terminal, the improvement which comprises a cable comprising an outer layer made of a plastic abrasion resistant material, a layer of a reinforcing material of Aramid fibers inside the outer layer said fibers having a flexibility measured in terms of modulus of 18 million $lb/in^2$ and tensile strength at least 400,000 $lbs/in^2$, a plurality of conductors through the center of said cable, a clamp for clamping said plastic material and said reinforcing material at said first end and a connector at said second end, said clamp has a diameter essentially the same as the diameter of said cable and is internally threaded, said clamp being snapped over the end of said plastic outer layer for a portion of about one inch in length whereby deformation of said portion of said plastic outer layer occurs, said clamp has a flange at the end which is snapped over said portion of the cable, said clamp has at least one longitudinal groove extending almost to said flange, said reinforcing material extending to the first end of said cable, whereby after the clamp is snapped over said portion of said outer layer, said reinforcing material enters said groove and is rigidly held thereon.

2. The cable according to claim 1 further comprising a second layer of plastic abrasion resistant material inside said layer of reinforcing material and a central core of said reinforcing material of aramid fibers surrounded by said plurality of conductors.

3. The cable according to claim 1 wherein said clamp has four longitudinal grooves.

4. The method according to claim 1 wherein said clamp has a flange at the end which is snapped over said first end of said cable.

5. The cable according to claim 1 wherein a steel net is placed at said second end.

6. The method of manufacturing a cable having conductors for use in computerized monitoring systems, said cable having one first end to be connected to a tool and the opposite end is intended to be connected to a computer, which comprises the steps of:

1) preparing a cable having an outer jacket of plastic abrasion-resistant material and a central core of fibers of reinforcing flexible material;
2) placing a plurality of conductors around the central core and inside the outer jacket; and
3) snapping a clamp of about one inch in length over said first end of the cable, said clamp being a hollow cylinder, said clamp having at least one groove and being internally threaded, whereby said outer jacket of plastic material is deformed and engages with said internally threaded clamp and said reinforcing material is held in said at least one groove.

7. The method according to claim 6 further comprising, placing a layer of plastic abrasion-resistant material around said plurality of conductors, placing a layer of reinforcing flexible material around said layer of plastic abrasion resistant material and inside said outer jacket, and the clamp has four grooves.

* * * * *